(12) United States Patent
Ronan et al.

(10) Patent No.: US 11,971,947 B2
(45) Date of Patent: Apr. 30, 2024

(54) RESTRICTED EDITING AND EDIT LOGGING IN A CO-BROWSE SESSION

(71) Applicant: Glance Networks, Inc., Wakefield, MA (US)

(72) Inventors: Brendan Ronan, Watertown, MA (US); Deborah Mendez, Arlington, MA (US); Joseph R. Belmonte, Milton, MA (US)

(73) Assignee: Glance Networks, Inc., Wakefield, MA (US)

( * ) Notice: Subject to any disclaimer, the term of this patent is extended or adjusted under 35 U.S.C. 154(b) by 0 days.

(21) Appl. No.: 18/208,975

(22) Filed: Jun. 13, 2023

(65) Prior Publication Data

US 2023/0401277 A1    Dec. 14, 2023

Related U.S. Application Data

(60) Provisional application No. 63/351,856, filed on Jun. 14, 2022.

(51) Int. Cl.
*G06F 16/958* (2019.01)
*G06F 11/34* (2006.01)

(52) U.S. Cl.
CPC ........ *G06F 16/986* (2019.01); *G06F 11/3476* (2013.01)

(58) Field of Classification Search
None
See application file for complete search history.

(56) References Cited

U.S. PATENT DOCUMENTS

| | | | |
|---|---|---|---|
| 8,806,024 B1 | 8/2014 | Toba Francis et al. | |
| 11,042,879 B1* | 6/2021 | Loucks | G06F 11/3438 |
| 2002/0138624 A1 | 9/2002 | Esenther | |
| 2003/0101235 A1 | 5/2003 | Zhang | |
| 2010/0306642 A1 | 12/2010 | Lowet et al. | |
| 2012/0185784 A1 | 7/2012 | Katz | |
| 2014/0082523 A1* | 3/2014 | Duquene | G06F 16/176 |
| | | | 715/753 |
| 2014/0195588 A1* | 7/2014 | Badge | H04L 65/403 |
| | | | 709/203 |

OTHER PUBLICATIONS

*International Search Report and Written Opinion* from corresponding PCT application PCT/US23/25113, dated Sep. 5, 2023 (8 pages).

* cited by examiner

*Primary Examiner* — Angela Nguyen
(74) *Attorney, Agent, or Firm* — Anderson Gorecki LLP

(57) ABSTRACT

Restricting and logging editing operations in a co-browse session, includes establishing a co-browse session between a first participant and a second participant in which a Document Object Model (DOM) of a first browser at the first participant is transmitted to the second participant, and used at the second participant to recreate a content of the first browser at a second browser. The DOM includes a plurality of DOM elements. A list of editable elements is implemented at the first browser, the list of editable elements specifying a first subset of the DOM elements, fewer than all of the DOM elements. When restricted editing is enabled on the co-browse session, the second participant is allowed to interact with any DOM element of the first subset of DOM elements but is not allowed to interact with any DOM elements not in the first subset of DOM elements.

18 Claims, 5 Drawing Sheets

FIG. 5

Visitor 100

Bank

Mortgage Prequalification Request

Apply for a Bank home mortgage.

When you connect with us, you'll be one step closer to owning a new home. After filling out this application, a mortga answer your questions about getting prequalified and discuss your home financing needs.

Please complete the fields below and click "Continue."

STEP 1 OF 4

Type of Loan — 500
Select Loan Type

Loan Purpose — 505
○ Purchase
○ Refinance

Do you have a Bank Lending Account? — 510
○ Yes
○ No 515    520

RESTRICTED EDITING AND EDIT LOGGING IN A CO-BROWSE SESSION

CROSS REFERENCE TO RELATED APPLICATIONS

This application claims priority to provisional patent application 63/351,856, filed Jun. 14, 2022, entitled Method and Apparatus for Restricting and Logging Co-Editing Operations in a Co-Browse Session, the content of which is hereby incorporated herein by reference.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD

The field relates to communication sessions and, more particularly, to a method and apparatus for restricting editing operations and logging edit operations in a co-browse session.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

All examples and features mentioned below can be combined in any technically possible way.

It is possible for the content of a first browser to be shared and reproduced in a second browser at a geographically remote location. One way to do this is to cause the Document Object Model (DOM) describing the content of the first browser to be forwarded to the second browser. The second browser uses the DOM received from the first browser to recreate the content of the first browser. Implementing DOM sharing between a pair of computers is referred to herein as co-browsing.

It is possible, on a co-browse session, to enable both participants to interact with elements of the webpage shown in the content of the first browser. For example, an agent might request permission to interact with the webpage shown on the visitor's display. In a customer support scenario, if an agent is helping a visitor to a website, providing the agent with remote control enables the agent to interact with all aspects of the website. While remote control can be beneficial, in some instances call centers are reluctant to or unable to allow their agents to assume remote control over the visitor's browser, for example due to concerns about compliance and liability.

According to some embodiments, restricted editing is enabled in a co-browse session by enabling an agent to have access to interact with particular elements of a webpage loaded to a visitor's browser, but not enabling the agent to have access to interact with all elements of the webpage. In some embodiments, a list of editable elements are loaded to the visitor browser in connection with co-browse JavaScript that specifies a restricted list of elements of the webpage the agent is able to edit during the co-browse session.

In some embodiments, an agent setting is used to configure whether the agent has the ability to implement restricted editing during a co-browse session. If the agent has restricted editing functionality enabled on the agent system, in some embodiments the agent will ask the visitor for permission to add restricted editing to the co-browse session. If permission is granted by the visitor, the agent is provided with the ability to interact with (click, type, etc.) any elements specified by the list of editable elements. Other ways of enabling restricted editing permission may also be used, depending on the implementation. For example, restricted editing may be included in the co-browse session by default, or the visitor may be provided with a control to enable restricted editing during the co-browse session.

Once restricted editing has been enabled, the agent will be able to interact with any element that is specified by the list of editable elements. However, the agent is not able to interact with elements of the webpage loaded to the visitor browser that are not specified by the list of editable elements. Restricting the type of actions that the agent can implement using restricted editing, by restricting the agent to interactions only with particular elements in the list of editable elements, provides safeguards on what the agent can and cannot do when the agent is actively interacting with the content of the visitor's browser.

Each interaction by the agent with one of the elements in the list of editable elements is logged by the visitor co-browse JavaScript. In some embodiments, attempted interactions by the agent with elements not specified by the list of editable elements are also logged. An example editing log entry might include the agent ID, a timestamp, an indication of the type of interaction, such as a keystroke/value or click indication, an identity of the element, the action type, and one or more unique session identifiers. The editing log entries are stored for subsequent retrieval, and/or optionally transmitted on the co-browse session or on another communication channel to an editing log repository at the agent, at the call center, or at a log server. Logging editing interactions between the agent and the visitor enables the actions of the agent to be differentiated from actions of the visitor, to provide an audit trail that can be used to recreate what happened during the co-browse session in the event of a subsequent dispute. In some embodiments, actions of the visitor on editable elements may be similarly logged when restricted editing has been enabled. In some embodiments, interaction with elements is also logged in instances where the agent has remote control, in which the agent is not restricted to only interacting with the elements included in the list of editable elements.

In some embodiments, a method of restricting and logging restricted editing operations in a co-browse session includes establishing a co-browse session between a first participant computer and a second participant computer in which a Document Object Model (DOM) of a first browser at the first participant computer is transmitted to the second participant computer, and used at the second participant computer to recreate a content of the first browser at a second browser, the DOM including a plurality of DOM elements, implementing a list of editable elements at the first browser, the list of editable elements specifying a first subset of the DOM elements, the first subset being fewer than all of the DOM elements, and enabling restricted editing on the co-browse session at the first browser, in which a second participant at the second participant computer is allowed to interact with the first subset of DOM elements specified by the list of editable elements and in which the second participant is not allowed to interact with any DOM elements in a second subset of DOM elements not included in the first subset of DOM elements.

In some embodiments, the method further includes logging interaction by the second participant with one or more of the DOM elements in the first subset of DOM elements during the co-browse session in an editing log. In some embodiments, the method further includes logging interaction by a first participant at the first participant computer with one or more of the DOM elements in the first subset of DOM elements during the co-browse session in the editing log. In some embodiments, the method further includes logging interaction by the second participant with one or more of the DOM elements in the second subset of DOM elements during the co-browse session in the editing log. In some embodiments, the method further includes logging interaction by the first participant with one or more of the DOM elements in the second subset of DOM elements during the co-browse session in the editing log. In some embodiments, the method further includes locally storing the editing log on the first participant computer. In some embodiments, the method further includes locally storing the editing log on the second participant computer.

In some embodiments, the list of editable elements contains a list of the first subset of DOM elements.

In some embodiments, the list of editable elements contains a list of the second subset of DOM elements.

In some embodiments, the method further highlighting each DOM element of the first subset of DOM elements on the co-browse session. In some embodiments, highlighting comprises adding an identifying marker to each DOM element of the first subset of DOM elements in the DOM of the first browser, and transmitting the identifying markers as part of the DOM of the first browser on the co-browse session. In some embodiments, the identifying marker added to each DOM element of the first subset of DOM elements is a dashed colored box surrounding the respective DOM element.

In some embodiments, enabling restricted editing on the co-browse session comprises requesting permission to enable restricted editing by the second participant computer and granting permission to enable restricted editing by the first participant computer.

In some embodiments, the method further includes receiving, by the first participant computer, an attempted interaction with a selected DOM element, and determining if remote control has been enabled on the co-browse session. In response to determining that remote control has been enabled on the co-browse session, the method further includes determining if the selected DOM element is included in a list of masked elements. In response to a determination that the selected element is not included in the list of masked elements, the method further includes enabling the attempted interaction with the selected DOM element.

In some embodiments, the method further includes receiving, by the first participant computer, an attempted interaction with a selected DOM element, and determining if remote control has been enabled on the co-browse session. In response to determining that remote control has been enabled on the co-browse session, the method further includes determining if the selected DOM element is included in a list of masked elements. In response to a determination that the selected element is included in the list of masked elements, the method further includes preventing the attempted interaction with the selected DOM element.

In some embodiments, the method further includes receiving, by the first participant computer, an attempted interaction with a selected DOM element, and determining if remote control has been enabled on the co-browse session. In response to determining that remote control has not been enabled on the co-browse session, the method further includes determining if restricted editing has been enabled on the co-browse session. In response to determining that restricted editing has been enabled on the co-browse session, the method further includes determining if the selected DOM element is included in the first subset of editable DOM elements. In response to a determination that the selected element is not included in the first subset of editable DOM elements, the method further includes preventing the attempted interaction with the selected DOM element.

In some embodiments, the method further includes receiving, by the first participant computer, an attempted interaction with a selected DOM element, and determining if remote control has been enabled on the co-browse session. In response to determining that remote control has not been enabled on the co-browse session, the method further includes determining if restricted editing has been enabled on the co-browse session. In response to determining that restricted editing has been enabled on the co-browse session, the method further includes determining if the selected DOM element is included in the first subset of editable DOM elements. In response to a determination that the selected element is included in the first subset of editable DOM elements, the method further includes determining if the selected DOM element is included in a list of masked elements. In response to a determination that the selected element is included in the list of masked elements, the method further includes preventing the attempted interaction with the selected DOM element.

In some embodiments, the method further includes receiving, by the first participant computer, an attempted interaction with a selected DOM element, and determining if remote control has been enabled on the co-browse session. In response to determining that remote control has not been enabled on the co-browse session, the method further includes determining if restricted editing has been enabled on the co-browse session. In response to determining that restricted editing has been enabled on the co-browse session, the method further includes determining if the selected DOM element is included in the first subset of editable DOM elements. In response to a determination that the selected element is included in the first subset of editable DOM elements, the method further includes determining if the selected DOM element is included in a list of masked elements. In response to a determination that the selected element is not included in the list of masked elements, the method further includes enabling the attempted interaction with the selected DOM element.

BRIEF DESCRIPTION OF THE DRAWINGS

Aspects of the present invention are pointed out with particularity in the appended claims. The present invention is illustrated by way of example in the following drawings, in which like references indicate similar elements. The following drawings disclose various embodiments of the present invention for purposes of illustration only and are not intended to limit the scope of the invention. For purposes of clarity, not every component may be labeled in every figure. In the figures:

FIG. 5 is a screenshot of an example visitor DOM showing several DOM elements as highlighted to indicate that those elements are able to be accessed and selectively controlled by an agent during a co-browse session, according to some embodiments.

DETAILED DESCRIPTION

The following detailed description sets forth numerous specific details to provide a thorough understanding of some embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
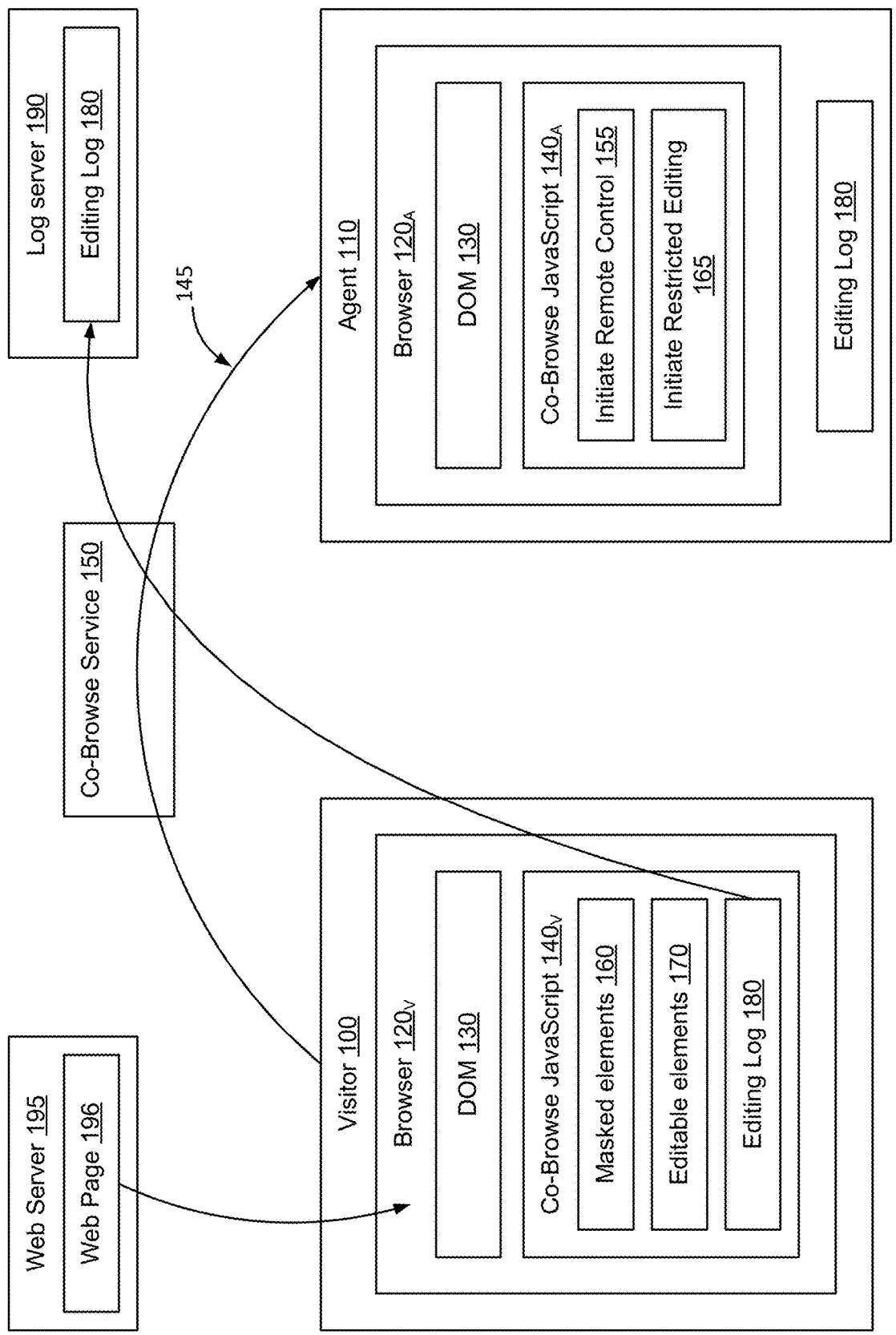
FIG. 1 is a functional block diagram of a network of components enabling restricted editing on a co-browse session between a visitor and an agent, according to some embodiments.

FIG. 1 is a functional block diagram of a network of components enabling restricted editing on a co-browse session 145 between a visitor 100 and an agent 110. As shown in FIG. 1, in some embodiments a web server 195 hosts a website. A visitor 100 accesses the website using visitor browser 120v to load a webpage 196 from the web server 195. The webpage 196 is described by visitor DOM 130.

It is possible for the content of a first browser to be shared and reproduced in a second browser at a geographically remote location. One way to do this is to cause the Document Object Model (DOM) describing the content of the first browser to be forwarded to the second browser. The second browser uses the DOM received from the first browser to recreate the content of the first browser. Implementing DOM sharing between a pair of computers is referred to herein as co-browsing. In some embodiments, a co-browse service 150 facilitates a co-browse session 145 on which the agent 110 is able to view the content of the visitor browser 120v in agent browser 120A.

In some embodiments, the webpage 196 loaded by visitor browser 120v from web server 195 is scripted with visitor co-browse JavaScript 140v. Alternatively, the co-browse JavaScript 140v may be loaded to visitor browser 120v as a plugin or extension, e.g., from co-browse service 150. If a co-browse session 145 is established, co-browse JavaScript 140v captures the Document Object Model (visitor DOM 130) describing the webpage 196 loaded in visitor browser 120v, and forwards the visitor DOM 130 to the co-browse service 150 on the co-browse session 145.

The co-browse service 150 provides the agent 110 with an agent page that is loaded to agent browser 120A. The agent page includes the visitor DOM 130 and agent co-browse JavaScript 140A. As changes occur to the visitor DOM 130 on the visitor 100, those changes are captured by the visitor co-browse JavaScript 140v and sent by the visitor 100 to the co-browse service 150 on the co-browse session 145 to be relayed to the agent 110. In this manner, co-browse service 150 facilitates transmission of the visitor DOM 130 and changes to the visitor DOM 130 to the agent browser 120A on co-browse session 145, to enable the agent browser 120A to have a consistent view of the content of the visitor's browser 120v. Additional details of how an example co-browse system of this nature may be implemented are provided in U.S. Pat. No. 9,736,214, entitled INTEGRATING CO-BROWSING WITH OTHER FORMS OF INFORMATION SHARING, the content of which is hereby incorporated herein by reference.

Throughout this description the term "visitor" will be used to refer to the computer that has a visitor browser 120v acting as the source of content on a co-browse session 145. The term "visitor" is not intended to be limiting, as other terms such as "presenter" or "content source" could equally be used. Thus, the term "visitor" is used merely for convenience. Likewise, throughout this description the term "agent" will be used to refer to the computer that has an agent browser 120A acting as the recipient of the content on the co-browse session 145. The term "agent" is not intended to be limiting, as other terms such as "viewer" or "content recipient" could equally be used. Thus, the term "agent" is used merely for convenience. The terms "visitor" and "agent" are not intended to limit the scope of the disclosure to only apply to the use case where a visitor to a website opens a co-browse session 145 to obtain assistance from an agent in a call center associated with the website, although that is one possible use of co-browse sessions 145. Likewise, although some examples are provided in which there is one visitor and one agent, it should be understood that there may be multiple visitors and/or agents on a given co-browse session.

As shown in FIG. 1, in some embodiments the visitor co-browse JavaScript 140v includes a list of masked elements 160, a list of editable elements 170, and an editing log data structure 180. The list of masked elements 160 identifies aspects of the DOM 130 that should be visible on the visitor browser 120v only. The elements that are masked are transmitted from the visitor browser 120v to the agent browser 120A, but the content of the elements is not transmitted from the visitor 100 to the agent 110, to thereby prevent sensitive information contained in the masked elements from leaving the visitor browser 120v. Masked elements may be used, for example in a banking context, to prevent the agent 110 from seeing the balance of the user's account. If the account balance is displayed in a "balance" element, information describing the "balance" element such as the shape, size, color, CSS, etc., will be transmitted from the visitor browser 120v to the agent browser 120A as part of the DOM 130, but the content of the "browser" element will not be transmitted. There are many instances where masking particular elements might be useful, and the use of masking is not limited to this particular banking example. Additional details associated with enabling masking on a co-browse session 145 are described in U.S. Pat. No. 9,736,214, entitled INTEGRATING CO-BROWSING WITH OTHER FORMS OF INFORMATION SHARING, the content of which is hereby incorporated herein by reference.

In some embodiments, the list of editable elements 170 identifies aspects of the DOM 130 that may be selectively accessed and interacted with by the agent 110, if restricted editing permission is granted during the co-browse session 145. Restricted editing, as that term is used herein, is used to refer to a scenario in which both participants to a co-browse session 145 (both the visitor 100 and agent 110 in FIG. 1) are able to interact with a particular element of the DOM 130. Interaction may include selecting an element by clicking on the element, selecting the element by touching the element on a touch-sensitive interactive display, typing a value into the element, changing the value of the element through one or more interactions with a menu associated with the element, or any other computer-based manner of interacting with a particular element. Where there are multiple agents 110 connected to the co-browse session 145, each agent 110 may be individually provided with restricted editing privileges or individually denied restricted editing privileges.

In some embodiments, the list of editable elements 170 describes a subset of all elements of the DOM 130 that the agent 110 is able to interact with when restricted editing is enabled. Regardless of the content of the list of editable elements 170, the visitor is able to interact with any interactive element of the webpage 196 loaded to visitor browser 120v. The agent 110, by contrast, is provided with limited privileges when restricted editing is enabled, and is limited to interacting only with the subset of elements of the DOM 130 that are specified by the list of editable elements 170.

In some embodiments, the list of editable elements 170 affirmatively lists those elements that the agent 110 is able to interact with. For example, if there are twenty elements on a given webpage, and an agent 110 with restricted editing privileges is to be allowed to interact with four of the twenty elements, the list of editable elements 170 may specify the four elements that the agent 110 is allowed to edit.

In some embodiments, the list of editable elements 170 affirmatively lists only those elements that the agent 110 is NOT able to interact with. For example, if the webpage 196 loaded to the visitor browser 120v is a .pdf form, the list of editable elements 170 may specify that the agent 110 can interact with any element of the webpage 196 with the exception of the "submit" button. Other ways of identifying elements may be used as well, depending on the implementation.

Restricted editing, as that term is used herein, is distinct from remote control. If an agent 110 is provided with "remote control" abilities on a co-browse session 145, the agent 110 is able to interact with any element of the webpage 196 loaded to the visitor browser 120v, optionally excluding elements of the browser that are specified by the list of masked elements. If restricted editing is allowed, by contrast, the agent 110 is able to interact with only those elements specified by the list of editable elements 170. The agent 110 is not provided with permission to interact with any element of the webpage 196 loaded to visitor browser 120v that is not specified by the list of editable elements 170.

As shown in FIG. 1, in some embodiments the co-browse JavaScript 140v includes an editing log data structure 180, also referred to herein as an editing log 180. The editing log 180 is used to maintain a record of all interactions by the agent 110 (and optionally by visitor 100) with any element in the list of editable elements 170. In instances where the agent is provided with remote control privileges, in some embodiments the editing log 180 is also used to capture interaction by the agent with objects of the DOM to create a record of agent and/or visitor interactions during the co-browse session.

In some embodiments, the editing log is locally stored on the visitor 100 and/or on the agent 110 for subsequent retrieval. The content of the editing log 180 may also be transmitted by the visitor co-browse JavaScript 140v during the co-browse session 145 or may be transmitted upon completion of the co-browse session 145. In some embodiments, the editing log 180 is created by or transmitted to the agent 110 and stored locally to provide the agent 110 with a record of editing actions that were taken during the co-browse session 145. The editing log 180 may optionally be stored elsewhere, for example on log server 190. Log server 190 may be a server that is associated with the agent 110, a server associated with the webpage 196 that is loaded by the visitor 100 to visitor browser 120v, a server associated with co-browse service 150, or to another network connected server.

Figure 2:
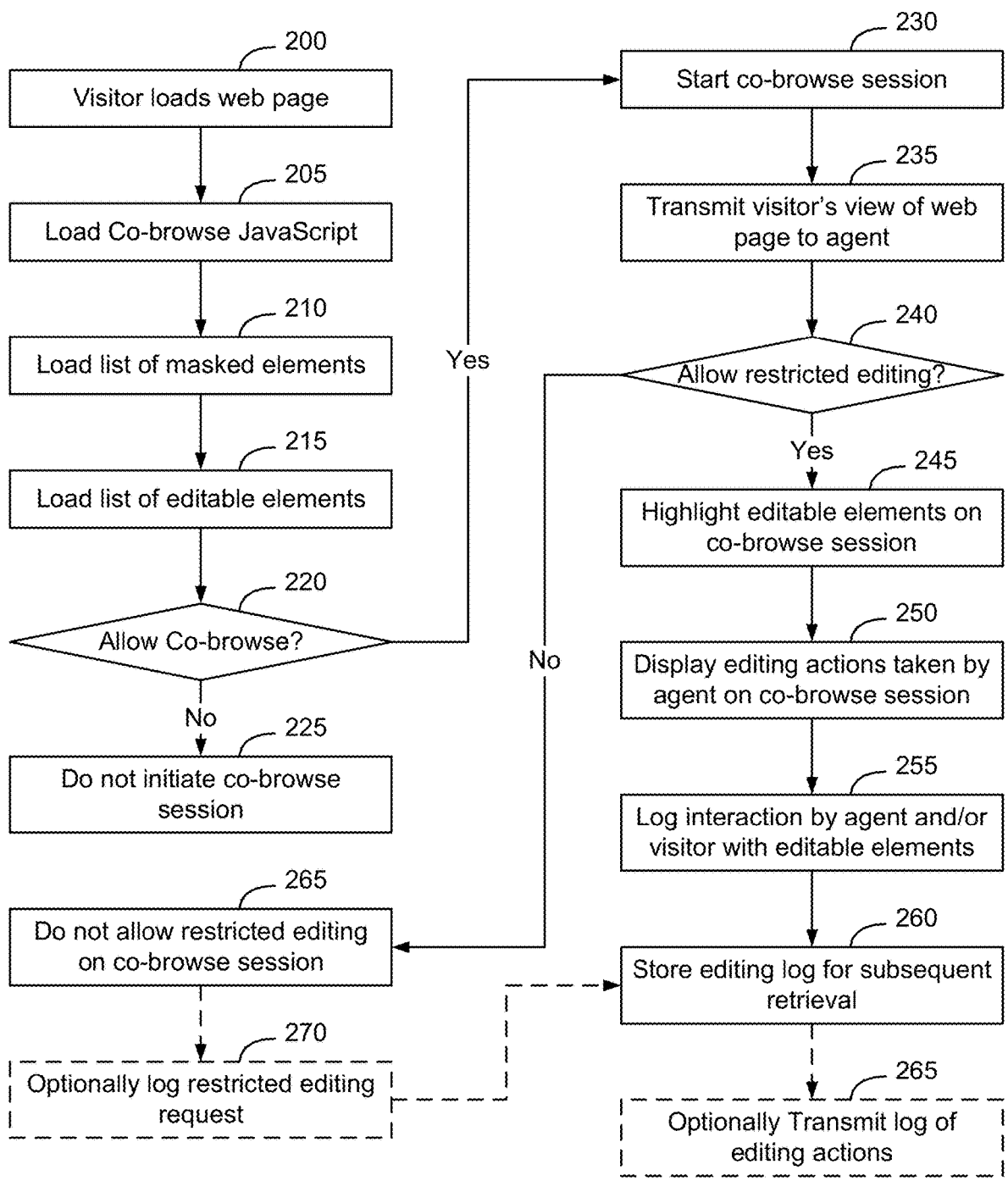
FIG. 2 is a flow chart of an example process used by a visitor to enable access to, and selective control over, a subset of visitor DOM elements by an agent during a co-browse session, according to some embodiments.

FIG. 2 is a flow chart of an example process used by a visitor 100 to enable access to, and selective control over, a subset of the elements of visitor DOM 130 by an agent 110 during a co-browse session 145, according to some embodiments. As shown in FIG. 2, at block 200 a visitor browser 120v loads a webpage 196 from a web server 195. It is assumed, in this example, that the webpage 196 is scripted with co-browse JavaScript 140v. Accordingly, when loading the webpage 196 (block 200) the visitor browser 120v will also load co-browse JavaScript 140v (block 205), which includes a list of masked elements 160 (block 210) and a list of editable elements 170 (block 215).

A determination is then made as to whether a co-browse session 145 should be started (block 220). Starting a co-browse session 145 may be implemented in multiple ways, depending on the implementation. In some embodiments, the agent 110 includes a control 155 that the agent may use to initiate a co-browse session 145 with the visitor 100. In some embodiments, the visitor 100 is required to affirmatively approve use of a co-browse session 145 for the co-browse session 145 to start. If the visitor 100 denies use of a co-browse session 145 (a determination of NO at block 220), a co-browse session 145 is not initiated with the agent 110 (block 225).

If the visitor approves the use of a co-browse session 145 (a determination of YES at block 220), the co-browse session 145 will start (block 230) and the co-browse session 145 is used to transmit the visitor browser 120v view of the webpage 196 to the agent browser 120A (block 235). As described herein, in some embodiments the co-browse session is implemented by transmitting the visitor DOM 130 and updates to the visitor DOM 130 to the agent 110.

During the co-browse session 145, either the agent 110 or the visitor 100 may initiate the use of restricted editing (block 240). In some embodiments, the agent page loaded to the agent browser 120A when the co-browse session 145 starts (block 230) includes a control button 165 that the agent 110 can use to request permission to implement restricted editing on the webpage 196 shown in the visitor's browser 120v. If the agent 110 requests restricted editing privileges on the co-browse session 145 (block 240), in some embodiments the visitor 100 is provided with the opportunity to approve or deny the use of restricted editing on the co-browse session 145. For example, a modal may be provided in the visitor browser that the visitor 100 can interact with to either approve or deny the use of restricted editing. If the visitor 100 denies provision of restricted editing privileges to the agent 110, or if the visitor 100 revokes provision of restricted editing privileges (a determination of NO at block 240), restricted editing privileges are not provided to the agent 110 (block 265) such that only the visitor 100 can interact with the elements of the webpage 196 shown in the visitor browser 120v. Optionally, whenever a request to include restricted editing is made, denied, or retracted, that action is recorded in the editing log 180 (block 270).

If restricted editing is allowed by the visitor 100 (a determination of YES at block 240), in some embodiments the editable elements are highlighted on the co-browse session 145 (block 245). Although FIG. 2 shows the editable elements as being highlighted after the request to enable restricted editing has been approved by the visitor 100, in some embodiments the editable elements are highlighted before the request to enable restricted editing has been approved, for example in response to the agent 110 transmitting the request to enable restricted editing to the visitor 100. Highlighting the editable elements in connection with providing the visitor 100 with the ability to approve or deny the request to enable restricted editing provides the visitor 100 with a visual indication of what elements the agent 110 will be able to access if the request to enable restricted editing is approved, which might make it easier for the visitor 100 to make an informed decision about whether to allow restricted editing.

Once restricted editing has been allowed (a determination of YES at block 240), the agent 110 is able to interact with any of the elements of the webpage 196 identified in the list of editable elements 170, but is not allowed to interact with or control any elements on the webpage 196 that are not specified by list of editable elements 170.

In some embodiments, DOM elements that are specified by the list of editable elements 170 are highlighted on the webpage (block 245). In some embodiments, the highlighting is added to the DOM by the visitor co-browse JavaScript 140v, and the highlighting becomes part of the DOM that is transmitted on the co-browse session 145. In this manner, the highlighting is visible to both the visitor 100 and the agent 110 on the co-browse session 145 to enable all co-browse participants to visually identify which elements are able to be edited by the agent.

Any interactions by the agent 110 will be displayed on the webpage 196 loaded in the visitor browser 120v (block 250) and thus become part of the DOM 130 that is shared on the co-browse session 145. All actions by the agent 110 on the editable elements, and optionally the actions by the visitor 100 on the editable elements, are recorded in the editing log 180 (block 255). The editing log is stored for subsequent retrieval, either at the visitor 100, the agent 110, or both (block 260). Optionally, the editing log 180 may be transmitted periodically or at the end of the co-browse session 145 from the visitor browser 120v, to the agent browser 120A, or to a log server 190 (block 265).

Figure 3:
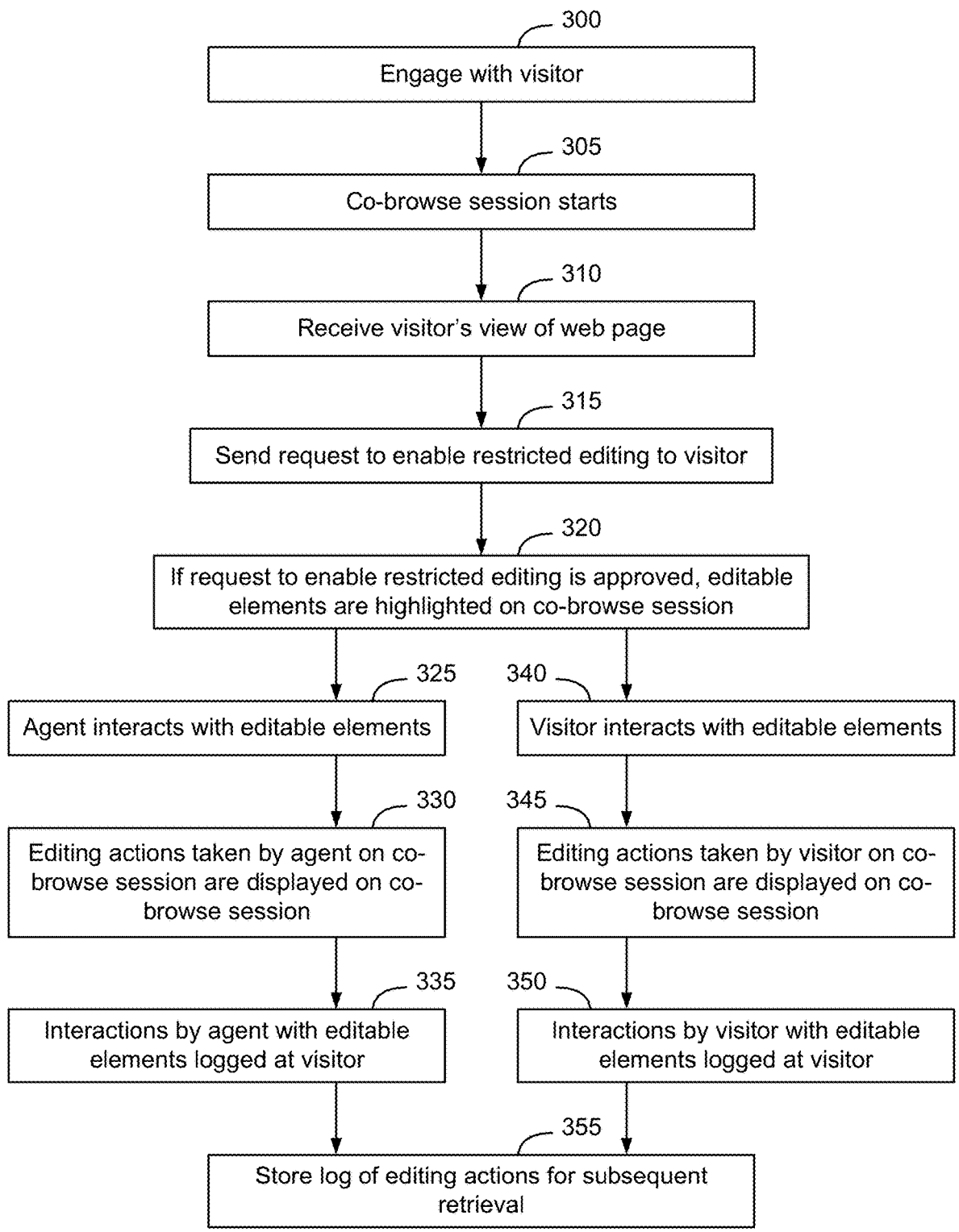
FIG. 3 is a flow chart of an example process used by an agent to access and selectively control a subset of visitor DOM elements during a co-browse session, according to some embodiments.

FIG. 3 is a flow chart of an example process used by an agent 110 to access and selectively control a subset of the elements of visitor DOM 130 during a co-browse session, according to some embodiments. As shown in FIG. 3, in some embodiments an agent 110 will engage with a visitor 100 (block 300) for example by text based interactive messaging, telephone or other audio communication, or some other communication channel. During the interaction, a decision is made to incorporate a co-browse session 145 into the customer engagement. Accordingly, a co-browse session 145 is started (block 305) and the agent 110 receives the visitor's view of the webpage 196 that is loaded into the visitor browser 120v, and uses the co-browse data on the co-browse session to recreate the visitor's view of the webpage in the agent's browser 120A (block 310).

In some embodiments, when a co-browse session 145 is started, a default setting is that the agent 110 is not able to interact with the content of the webpage 196 loaded on the visitor's browser 120v unless the visitor 100 gives the agent 110 permission to do so. Accordingly, if the agent 110 would like to be able to interact with the webpage 196 on the co-browse session 145, in some embodiments the agent 110 is required to send a request to the visitor 100 to enable restricted editing (block 315). On the visitor screen, the request to enable restricted editing may pop up as a dialog or modal requesting that the visitor 100 approve or deny the agent's 110 request to initiate restricted editing. Optionally, in some embodiments a control is provided by the visitor co-browse JavaScript 140v that will enable the visitor 100 to initiate providing restricted editing permission to the agent 110 without the agent 110 first sending a request for restricted editing permission.

If the request to enable restricted editing is approved, editable elements are highlighted on the co-browse session 145 (block 320). Optionally, the highlighting may take the form of a box drawn around the editable elements. In some embodiments, the box may be implemented using dashed lines, which may make the highlighting easier to decipher for individuals with limited ability to distinguish between colors or other visual impairments. In some embodiments, the highlighting is added to the visitor's DOM 130 and is transmitted on the co-browse session 145, to be visible to both the visitor 100 and agent 110 on the co-browse session 145.

Once restricted editing has been initiated, the agent 110 is able to interact with the subset of elements of the DOM 130 that are specified by the list of editable elements 170. When the agent 110 interacts with one of the editable elements (block 325), the editing actions taken by the agent 110 on the co-browse session 145 are displayed on the co-browse session 145 (block 330). Thus, for example, if an agent 110 types characters into an editable field, the characters typed by the agent 110 will appear in the editable field and be transmitted to all participants on the co-browse session 145. Likewise, if the agent 110 clicks on a box or otherwise interacts with an element on the list of editable elements 170, those actions will change the state of the webpage 196 in the visitor's browser 120v, and will appear on the co-browse session 145.

In some contexts, it is important to document what actions were taken by the agent 110 when interacting with a visitor 100 on a co-browse session 145. For example, if a visitor 100 is applying for a bank loan, and the agent 110 is helping the visitor 100 fill out the paperwork for the loan, the bank might need to maintain a log of which fields were completed by the visitor 100 and which fields were completed by the agent 110. Accordingly, in some embodiments, all restricted editing actions taken by the agent 110 on the co-browse session 145 are logged (block 335).

In some embodiments, the visitor is allowed to interact with elements of the webpage regardless of whether restricted editing has been initiated. Accordingly, after restricted editing has been initiated, the visitor 100 continues to be able to interact with all elements of the webpage, including the subset of elements of the DOM 130 that are specified by the list of editable elements 170. When the visitor 100 interacts with one of the editable elements (block 340), the editing actions taken by the visitor 100 on the co-browse session 145 are displayed on the co-browse session 145 (block 345). Thus, for example, if a visitor 100 types characters into an editable field, the characters typed by the visitor 100 will appear in the editable field and be transmitted to all participants on the co-browse session 145. Likewise, if the visitor 100 clicks on a box or otherwise interacts with an element on the list of editable elements 170, those actions will change the state of the webpage 196 in the visitor's browser 120v, and will appear on the co-browse session 145.

In some contexts, it is important to document what actions were taken by the visitor 100 as well as by the agent 110, particularly when interacting with the elements specified by the list of editable elements 170. Accordingly, in some embodiments, all editing actions taken by the visitor 100 on elements in the list of editable elements 170 on the co-browse session 145 are logged (block 350). Optionally, actions taken by the visitor on elements not included in the list of editable elements 170 may also be logged (block 350).

In some embodiments, the visitor co-browse JavaScript 140v maintains an editing log 180 of interactions with editable elements. The editing log 180 may include identifying information about the website that was co-browsed, the webpage, and other identifying information to identify the context of the interaction between the visitor and agent. The editing log 180 also includes information about the type of interaction with particular elements of the website. Multiple types of agent 110 interaction with elements included in the restricted list of editable elements 170 may be included in the editing log 180. In some embodiments, the editing log 180 includes every keystroke made by an agent 110. In other embodiments, the editing log 180 includes groups of keystrokes made by the agent 110. For example, if an agent 110 is interacting with a field and types the word "Apply", the editing log 180 might include five entries—one entry for each letter "A", "p", "p", "l", and "y". Alternatively, the editing log 180 might include a single entry for the word "Apply". The particular manner in which agent 110 interactions are logged may depend on the particular implementation.

The editing log 180 of editing actions by the agent 110 and/or visitor 100 are stored for subsequent retrieval, to enable the log of editing actions 180 to be maintained after conclusion of the co-browse session 145 (block 355). In some embodiments, the editing log 180 may also be transmitted to an external editing log repository. In some embodiments, the co-browse JavaScript 140v is configured to transmit the editing log 180 during the co-browse session, when the browser is closed, just prior to ending the co-browse session 145, or after the co-browse session has ended. In implementations where the editing log is configured to be transmitted to an external editing log repository, the particular timing associated with transmission of the editing log 180 will depend on the particular implementation.

There are instances where a given element might be specified by both the list of masked elements 160 and by the list of editable elements 170. Likewise, there are different levels of restricted editing privilege that might be provided to an agent 110. For example, an agent 110 might have remote control privilege, in which the agent is able to interact with all elements of the webpage 196 loaded to the visitor browser 120v. The agent 110 might have restricted editing privileges, in which the agent 110 is able to interact with only those elements specified by the list of editable elements 170. Finally, the agent 110 might have no restricted editing privileges. In some instances, multiple agents 110 might be connected to the co-browse session 145, and each of the agents 110 might have different restricted editing privileges. Although FIG. 1 shows some embodiments in which the visitor 100 has a single list of editable elements 170, it should be understood that the visitor 100 might have multiple lists of editable elements 170 that may be used to provide different agents with the ability to interact with different sets of editable elements, or to provide the same agent with escalating differentiated ability to interact with greater numbers of elements based on visitor permission.

Figure 4:
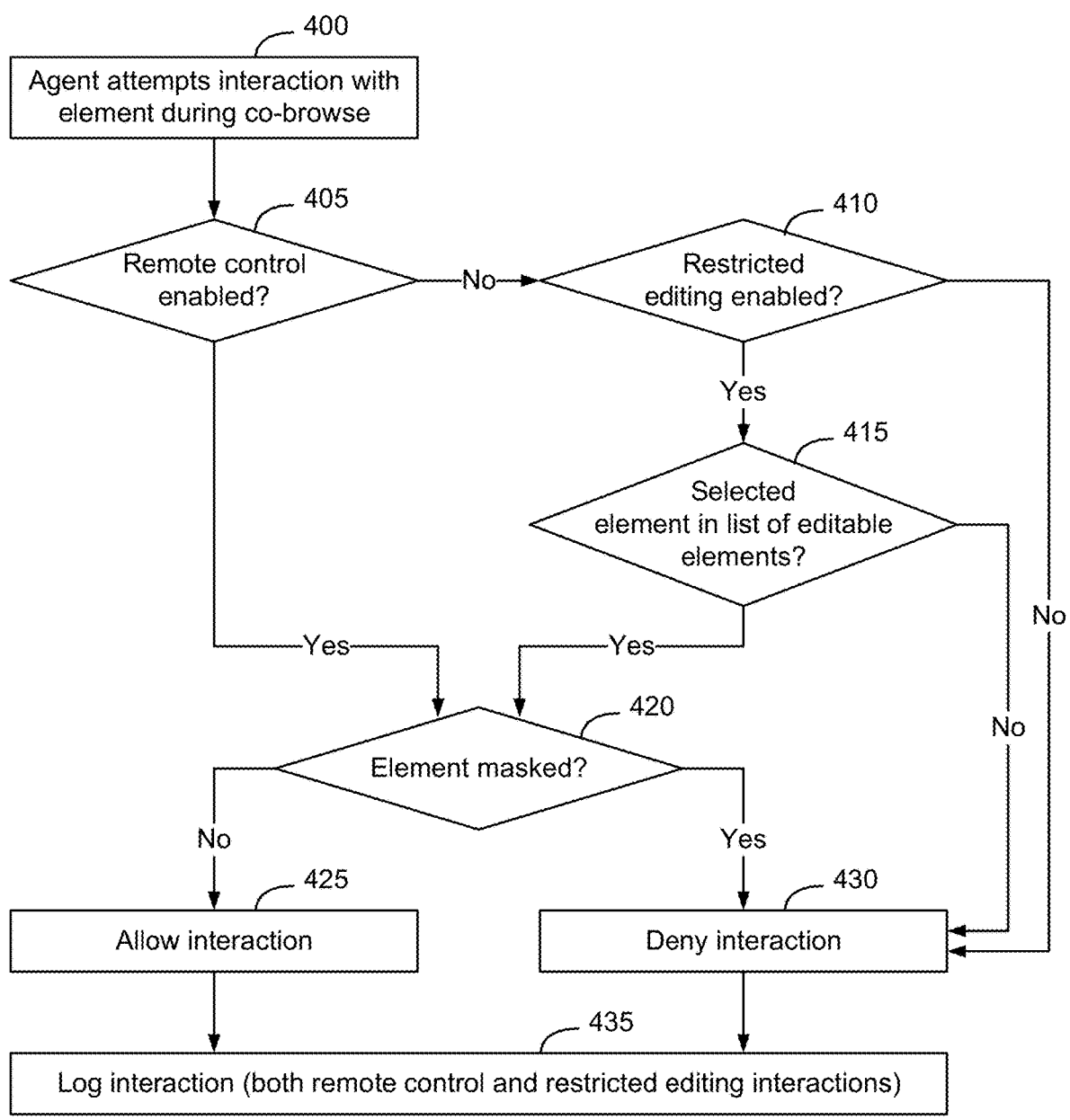
FIG. 4 is a flow chart of an example process used by co-browse JavaScript on a visitor browser to enable access and selective control of a particular selected element by an agent during a co-browse session, according to some embodiments.

Accordingly, FIG. 4 is a flow chart of an example process used by co-browse JavaScript 140v on a visitor browser 120v to enable access to, and selective control over, particular selected elements by an agent 110 during a co-browse session 145, according to some embodiments. In some embodiments, the process shown in FIG. 4 is used by the visitor co-browse JavaScript 140v each time an agent 110 attempts to interact with a particular element. As shown in FIG. 4, when an agent 110 attempts to interact with an element during a co-browse session 145 (block 400), the visitor co-browse JavaScript 140v determines if the agent 110 has been provided with remote control privileges (block 405).

If the agent 110 has been provided with remote control privileges (a determination of YES at block 405) the agent 110 has the ability to interact with all elements of the webpage 196. Hence, the agent 110 is able to interact with this particular selected element. However, in some embodiments, agents 110 with remote control privileges are not allowed to interact with masked elements. Accordingly, in some embodiments, a determination is made as to whether the agent 110 is attempting to interact with an element that is specified by the list of masked elements 160 (block 420). If the element is not specified by the list of masked elements 160 (a determination of NO at block 420) the attempted interaction by the agent 110 with the selected element is allowed (block 425). If the element is specified by the list of masked elements 160 (a determination of YES at block 420) the attempted interaction by the agent 110 with the selected element is denied (block 430). In either instance (interaction allowed—block 425, or interaction denied—block 430), the interaction or attempted interaction by the agent with the selected element while the agent has remote control privileges is logged (block 435).

If the agent 110 does not have remote control privileges (a determination of NO at block 405), the visitor co-browse JavaScript 140v determines whether the agent 110 has restricted editing privileges (block 410). If the agent 110 does not have restricted editing privileges (a determination of NO at block 410), interaction by the agent 110 with the selected element is denied (block 430). Optionally, attempted interaction by the agent with an element while the agent does not have remote control and/or restricted editing privileges is logged (block 435).

If the agent 110 does have restricted editing privileges (a determination of YES at block 410), the visitor co-browse JavaScript 140v determines whether the selected element is in the list of editable elements 170 (block 415). If the selected element is not in the list of editable elements 170 (a determination of NO at block 415), interaction by the agent 110 with the selected element is denied (block 430). If the selected element is specified by the list of editable elements 170 (a determination of YES at block 415), a determination is made as to whether the agent 110 is attempting to interact with an element that is specified by the list of masked elements 160 (block 420). If the element is not specified by the list of masked elements 160 (a determination of NO at block 420) the interaction by the agent 110 with the selected element is allowed (block 425). If the element is specified by the list of masked elements 160 (a determination of YES at block 420) the interaction by the agent 110 with the selected element is denied (block 430). In either instance (interaction allowed—block 425, or interaction denied—block 430), the interaction or attempted interaction by the agent 110 with the selected element is logged (block 435).

FIG. 5 is a screenshot of an example visitor DOM 130 showing several DOM elements as highlighted to indicate that those elements are able to be accessed and selectively controlled by an agent 110 during a co-browse session 145, according to some embodiments. The highlighting, in some embodiments, is added by the visitor co-browse JavaScript 140v to the co-browse session 145 such that it is visible to both the visitor and the agent on the co-browse session 145. In the example screenshot, the webpage 196 has three elements that are editable by the agent once restricted editing has been enabled—a first element 500 which is a drop-down menu that enables a type of loan to be specified, a second element 505 which is a set of radio buttons configured to receive input regarding the loan purpose, and a third element 510 configured to enable the user to specify whether the user has a lending account with the bank.

In the example shown in FIG. 5, each of these elements 500, 505, 510, has been specified by the list of editable elements 170 as able to be interacted with by the agent 110 and, accordingly, each has been highlighted by causing a rectangular box to be drawn around the editable element once restricted editing has been requested and/or enabled on the co-browse session. Note that, in this example, that the elements titled "cancel" 515 and "continue" 520 are not editable by the agent and, hence, have not been highlighted. Only the visitor 100 can interact with the "cancel" button 515 and the "continue" button 520 thus preventing the agent 110 from canceling out of the transaction and requiring the visitor 100 to approve the values entered by the agent 110 by personally clicking on the "continue" button 520. It should be noted that any interaction between the agent 110 and one or more of the editable elements 500, 505, 510, will result in creation of an entry in the editing log 180. Optionally, attempted interaction by the agent with the non-editable elements 515, 520, may also be identified and added to the editing log 180. Likewise, interaction by the visitor with the editable elements 500, 505, 510, and with the non-editable elements 515, 520, may also be identified and added to the editing log 180.

The editing log 180 may include multiple aspects of information configured to enable actions by the agent 110 and/or visitor 100 to be recreated after conclusion of the co-browse session 145. In some embodiments, each editing log entry includes the agent ID, a timestamp, an indication of the type of interaction, such as a keystroke/value or click indication, an identify of the element that the agent 110 interacted with, the action type, and one or more unique session identifiers. The session identifiers might include a unique value associated with the co-browse session 145, a unique value associated with the visitor's connection to the website (e.g., a cookie value), or other unique value that can associate the log entries with interaction with particular elements and with particular visitor 100 at a particular point in time. The editing log entries are stored locally for subsequent retrieval and/or optionally transmitted on the co-browse session 145 or on another communication channel to an editing log repository at the agent 110, to the call center, to a log server 190, or to another log repository. Logging editing interactions between the agent 110 and the visitor 100 enables the actions of the agent 110 to be differentiated from actions of the visitor 100, to provide an audit trail that can be used to recreate what happened during the co-browse session 145 in the event of a subsequent dispute. In some embodiments, actions of the visitor 100 on editable elements may be similarly logged when restricted editing has been enabled.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive. The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of restricting and logging restricted editing operations in a co-browse session, comprising the steps of:
    establishing a co-browse session between a first participant computer and a second participant computer in which a Document Object Model (DOM) of a first browser at the first participant computer is transmitted to the second participant computer, and used at the second participant computer to recreate a content of the first browser at a second browser, the DOM including a plurality of DOM elements;
    implementing a list of editable elements at the first browser, the list of editable elements specifying a first subset of the DOM elements, the first subset being fewer than all of the DOM elements; and
    enabling restricted editing on the co-browse session at the first browser, in which a second participant at the second participant computer is allowed to interact with the first subset of DOM elements specified by the list of editable elements and in which the second participant is not allowed to interact with any DOM elements in a second subset of DOM elements not included in the first subset of DOM elements.

2. The method of claim 1, further comprising logging interaction by the second participant with one or more of the DOM elements in the first subset of DOM elements during the co-browse session in an editing log.

3. The method of claim 2, further comprising logging interaction by a first participant at the first participant computer with one or more of the DOM elements in the first subset of DOM elements during the co-browse session in the editing log.

4. The method of claim 2, further comprising logging interaction by the second participant with one or more of the DOM elements in the second subset of DOM elements during the co-browse session in the editing log.

5. The method of claim 2, further comprising logging interaction by the first participant with one or more of the DOM elements in the second subset of DOM elements during the co-browse session in the editing log.

6. The method of claim 5, further comprising locally storing the editing log on the first participant computer.

7. The method of claim 5, further comprising locally storing the editing log on the second participant computer.

8. The method of claim 1, wherein the list of editable elements contains a list of the first subset of DOM elements.

9. The method of claim 1, wherein the list of editable elements contains a list of the second subset of DOM elements.

10. The method of claim 1, further comprising highlighting each DOM element of the first subset of DOM elements on the co-browse session.

11. The method of claim 10, wherein highlighting comprises adding an identifying marker to each DOM element of the first subset of DOM elements in the DOM of the first browser, and transmitting the identifying markers as part of the DOM of the first browser on the co-browse session.

12. The method of claim 11, wherein the identifying marker added to each DOM element of the first subset of DOM elements is a dashed colored box surrounding the respective DOM element.

13. The method of claim 1, wherein enabling restricted editing on the co-browse session comprises requesting permission to enable restricted editing by the second participant computer and granting permission to enable restricted editing by the first participant computer.

14. The method of claim 1, further comprising receiving, by the first participant computer, an attempted interaction with a selected DOM element;
    determining if remote control has been enabled on the co-browse session;
    in response to determining that remote control has been enabled on the co-browse session, determining if the selected DOM element is included in a list of masked elements; and
    in response to a determination that the selected element is not included in the list of masked elements, enabling the attempted interaction with the selected DOM element.

15. The method of claim 1, further comprising receiving, by the first participant computer, an attempted interaction with a selected DOM element;
    determining if remote control has been enabled on the co-browse session;
    in response to determining that remote control has been enabled on the co-browse session, determining if the selected DOM element is included in a list of masked elements; and
    in response to a determination that the selected element is included in the list of masked elements, preventing the attempted interaction with the selected DOM element.

16. The method of claim 1, further comprising receiving, by the first participant computer, an attempted interaction with a selected DOM element;
    determining if remote control has been enabled on the co-browse session;
    in response to determining that remote control has not been enabled on the co-browse session, determining if restricted editing has been enabled on the co-browse session;
    in response to determining that restricted editing has been enabled on the co-browse session, determining if the selected DOM element is included in the first subset of editable DOM elements; and
    in response to a determination that the selected element is not included in the first subset of editable DOM elements, preventing the attempted interaction with the selected DOM element.

17. The method of claim 1, further comprising receiving, by the first participant computer, an attempted interaction with a selected DOM element;
    determining if remote control has been enabled on the co-browse session;

in response to determining that remote control has not been enabled on the co-browse session, determining if restricted editing has been enabled on the co-browse session;

in response to determining that restricted editing has been enabled on the co-browse session, determining if the selected DOM element is included in the first subset of editable DOM elements;

in response to a determination that the selected element is included in the first subset of editable DOM elements, determining if the selected DOM element is included in a list of masked elements; and in response to a determination that the selected element is included in the list of masked elements, preventing the attempted interaction with the selected DOM element.

18. The method of claim 1, further comprising receiving, by the first participant computer, an attempted interaction with a selected DOM element;

determining if remote control has been enabled on the co-browse session;

in response to determining that remote control has not been enabled on the co-browse session, determining if restricted editing has been enabled on the co-browse session;

in response to determining that restricted editing has been enabled on the co-browse session, determining if the selected DOM element is included in the first subset of editable DOM elements;

in response to a determination that the selected element is included in the first subset of editable DOM elements, determining if the selected DOM element is included in a list of masked elements; and in response to a determination that the selected element is not included in the list of masked elements, enabling the attempted interaction with the selected DOM element.

* * * * *